(12) United States Patent
Guichard et al.

(10) Patent No.: US 8,926,887 B2
(45) Date of Patent: Jan. 6, 2015

(54) DEVICE FOR SHAPING MATERIALS USING INDUCTION HEATING THAT ENABLES PREHEATING OF THE DEVICE

(75) Inventors: Alexandre Guichard, La Chapelle du Mont du Chat (FR); Jose Feigenblum, Saint-Paul (FR)

(73) Assignee: Roctool, Le Bourget du Lac Cedex (FR)

( * ) Notice: Subject to any disclaimer, the term of this patent is extended or adjusted under 35 U.S.C. 154(b) by 786 days.

(21) Appl. No.: 13/124,739

(22) PCT Filed: Oct. 14, 2009

(86) PCT No.: PCT/FR2009/051960
§ 371 (c)(1),
(2), (4) Date: Jun. 8, 2011

(87) PCT Pub. No.: WO2010/046582
PCT Pub. Date: Apr. 29, 2010

(65) Prior Publication Data
US 2011/0233826 A1    Sep. 29, 2011

(30) Foreign Application Priority Data

Oct. 20, 2008    (FR) ...................... 08 57126

(51) Int. Cl.
*B29C 35/02*    (2006.01)
*B29C 33/06*    (2006.01)
*B29C 35/08*    (2006.01)
*B29C 43/52*    (2006.01)
*H05B 6/10*    (2006.01)
*B29C 33/08*    (2006.01)

(52) U.S. Cl.
CPC ............. *B29C 33/06* (2013.01); *B29C 35/0805* (2013.01); *B29C 43/52* (2013.01); *H05B 6/105* (2013.01); *B29C 33/08* (2013.01); *B29C 2035/0811* (2013.01)
USPC ............ 264/486; 425/407; 219/601; 219/634

(58) Field of Classification Search
USPC .................... 264/486; 425/407; 219/601, 634
See application file for complete search history.

(56) References Cited

U.S. PATENT DOCUMENTS

| | | | |
|---|---|---|---|
| 6,846,445 B2 * | 1/2005 | Kim et al. | ...................... 264/404 |
| 2007/0267405 A1 | 11/2007 | Feigen-Blum et al. | |
| 2008/0230957 A1 | 9/2008 | Feigenblum et al. | |

FOREIGN PATENT DOCUMENTS

| | | |
|---|---|---|
| AT | 504 784 A4 | 8/2008 |
| FR | 2 890 588 A1 | 3/2007 |
| WO | 2005/094127 A1 | 10/2005 |
| WO | 2007/031660 A1 | 3/2007 |

OTHER PUBLICATIONS

International Search Report, dated Feb. 15, 2010, from corresponding PCT application.

* cited by examiner

*Primary Examiner* — Galen Hauth
(74) *Attorney, Agent, or Firm* — Young & Thompson

(57) ABSTRACT

A molding device for the shaping of a material includes:
  a lower mold body, or die, made from an electrically conductive material and including a molding zone intended to be in contact with the material to be shaped;
  an upper mold body, or punch, made from an electrically conductive material, and including a molding zone intended to be in contact with the material to shaped;
  a removable intermediate part, or core, made of an electrically conductive material, and intended to be inserted between the die and the punch;
  induction elements for generating a magnetic field that surrounds the die, the punch and the intermediate part; these three components being electrically insulated in pairs, so that the opposite faces of the intermediate part and the die, and those of the intermediate part and the punch, delimit two air gaps in which the magnetic field flows which induces currents at the surface of the molding zones of the die and the punch, thus making it possible to localize the action of the inductors at the surface of the molding zones.

20 Claims, 3 Drawing Sheets

DEVICE FOR SHAPING MATERIALS USING INDUCTION HEATING THAT ENABLES PREHEATING OF THE DEVICE

The present invention relates to a device and a method using induction heating in order to carry out the shaping, particularly by molding, of materials, in particular thermoplastic or thermosetting matrix composite materials.

BACKGROUND OF THE INVENTION

A device is known, such as that described in international patent application no. WO2005/094127, which makes it possible to localize the induction heating, so as to delimit the heating at the mold/material interface.

Such a device comprises inductors surrounding two electrically conductive mold bodies and comprising a heating zone intended to be in contact with the material to be shaped, the mold bodies being electrically insulated from each other. Thus, thanks to this electrical disconnection between the two mold bodies, the opposite faces of these latter delimit an air gap through which the magnetic field created by the inductors flows. The magnetic field thus induces electrical currents on the surface of the mold bodies, and especially on the surface of the heating zone of each mold body, thereby allowing the heating to be localized at the surface, close to the material to be heated.

Such a device allows a very quick and very significant rise in temperature of the heating zones, given the fact that the energy generated by the inductors is "injected" directly at the surface of the heating zones, in a very thin layer (typically a few tenths of a millimeter). To benefit as much as possible from the effect of the air gap, its width, i.e. the distance between the opposite faces of the device when it is operating, must be as small as possible, of the order of a few millimeters. In practice, this width is determined by the thickness of the part to be heated, which acts as an insulator between the two portions of the device. When this part is electrically conductive, insulating shims of a suitable thickness to insulate the two portions of the device, or an insulating coating on the surfaces in contact with the part, are provided.

Some materials require special molding techniques. This is the case, for example, for thermoplastic materials with long fibers, called L.F.T ("Long Fiber Thermoplastics"). To be properly molded, such material must be deposited hot onto a mold that is itself already at temperature. However, the known molds, because of their thermal inertia, do not permit heating/cooling cycles that are fast enough to be able to deposit material onto a mold at the ideal temperature and then cool this mold to obtain a solidified part, all in a commercially interesting time. To overcome this problem, the current techniques utilize molds maintained at a constant "intermediate" temperature, which is a compromise between the satisfactory flowing of the material and its correct solidification in the mold. At the same time, the material is deposited at a very high temperature, close to its degradation limit. For instance, for an L.F.T. material deposited at 250° C., the mold used will be at an intermediate temperature, between 80° C. and 100° C., which allows an acceptable flowing of the material, and at the same time its cooling below its solidification point.

To perform such an operation, it is known to carry out the preheating of the material outside of the mold, for example in an infrared oven or on a hot plate, then move the material onto a two-piece mold, the latter being kept at the required temperature while the material is preheated. The material is deposited in the mold as a soft and malleable paste that, under the pressure exerted by the two portions of the mold, begins to flow to fill the entire molding space, thus taking the shape of the finished part. To carry out this operation it is necessary that both portions of the mold, when in contact, define a compression chamber, i.e. that sealing is provided in order to exert the pressure necessary for the material to flow without it escaping. The temperature of the mold allows the gradual cooling of the material below its solidification point, so the part can be ejected. However, the mold temperature is often too high for optimum cooling, and the part is often still soft when removed, which poses problems with the final quality (distortion, residual stresses, etc.).

In summary, the methods currently implemented represent a compromise that does not allow either the satisfactory flowing of the material or sufficient cooling of the finished part to be achieved.

SUMMARY OF THE INVENTION

It is therefore of interest to implement a mold allowing shorter (heating/cooling) cycle times, making it possible to deposit the material onto a mold at much higher a temperature than the "intermediate" temperature (thus enhancing the part's flowing for a satisfactory filling of the mold), then rapidly cooling this mold to a temperature below the intermediate temperature (thus promoting proper cooling of the finished part).

An induction heating device as mentioned above allows very short heating/cooling cycles, but its use for molding a material such as L.F.T. seems inappropriate. Indeed, the need to provide a compression chamber with a satisfactory sealing is hardly compatible with the technology of this type of device, which requires the two sides of the mold to be electrically insulated so that it is heated.

The invention is intended to modify such a device to make it suitable for molding materials of the type described above. In particular, the invention starts from the observation that it is not possible to preheat such a mold if it is opened, or else with performance levels that are too low, because the width of the air gap can then be more than ten centimeters, its effect then becoming negligible.

Thus, the invention relates to a molding device for the shaping of a material, comprising:
  a lower mold body, or die, made from an electrically conductive material and comprising a molding zone intended to be in contact with the material to be shaped;
  an upper mold body, or punch, made from an electrically conductive material, and comprising a molding zone intended to be in contact with the material to be shaped;
  a removable intermediate part, or core, made of an electrically conductive material, and intended to be inserted between the die and the punch;
  induction means capable of generating a magnetic field that surrounds the die, the punch and the intermediate part; these three components being electrically insulated in pairs, so that the opposite faces of the intermediate part and the die on the one hand, and of the intermediate part and the punch on the other hand, delimit two air gaps in which the magnetic field flows which induces currents at the surface of the molding zones of the die and the punch, thus making it possible to localize the action of the inductors at the surface of the molding zones.

In an embodiment, shims transparent to the magnetic field provide electrical insulation between the die and the intermediate part on the one hand, and between the intermediate part and the punch on the other hand.

In an embodiment, the molding zones of the two mold bodies are capable of forming a closed chamber, for example a chamber known as a compression chamber.

In an embodiment, a portion including the molding zone of at least one of the two mold bodies comprises a magnetic compound, preferably of a relative magnetic permeability and high electrical resistivity, such as a nickel-, chromium- and/or titanium-based steel.

In an embodiment, a portion of at least one of the two mold bodies comprises a different material from the portion including the molding zone, notably a non-magnetic or a weakly magnetic material, for example stainless steel.

In an embodiment, at least one of the two mold bodies comprises a magnetic material, its surfaces located opposite the induction means, except for the surface of its molding zone, being covered with a layer of shielding made of a non-magnetic material preventing the magnetic field penetrating into the mold body.

In an embodiment, the intermediate part comprises a non-magnetic material, preferably of a low electrical resistivity, such as aluminum.

In an embodiment, the intermediate part comprises a contact coating, such as silicone.

In an embodiment, the intermediate piece comprises a material characterized by an emissivity greater than 0.7, such as graphite.

In an embodiment, at least one of the two mold bodies comprises a network of cooling channels.

In an embodiment, the intermediate part also includes a network of cooling channels.

In an embodiment, the frequency of the magnetic field generated by the induction means is greater than or equal to 10 kHz and preferably less than or equal to 100 kHz.

In an embodiment, the induction means comprise two separable portions, respectively secured to the die and the upper body.

The invention also relates to a method of preheating a molding device as defined above, the method comprising the steps of:
- inserting the intermediary part between the die and the punch;
- electrically insulating in pairs the intermediary part and the two mold bodies, so that the opposite faces of the intermediate part and the die on the one hand, and of the intermediate part and the punch on the other hand, delimit two air gaps;
- powering induction means for generating a magnetic field that surrounds the die, the punch and the intermediate part;
- such that the magnetic field flows in the two air gaps, and induces currents at the surface of the molding zones of the die and the punch, thus making it possible to localize the preheating at the surface of the molding zones.

The invention also relates to a method for molding a material comprising the steps of:
- implementing the preheating of a molding device as defined above;
- removing the intermediate part from the molding device;
- depositing a material to be molded on one of the mold bodies;
- molding the material by pressurization between the two mold bodies;
- cooling the mold;
- removing the solidified part.

Finally, the invention relates to a method for molding a material comprising the steps of:
- implementing the preheating of a molding device as defined above, a material to be molded having been previously placed between the die and the intermediate part;
- removing the intermediate part from the molding device;
- molding the material by pressurization between the two mold bodies;
- cooling the mold;
- removing the solidified part.

BRIEF DESCRIPTION OF THE DRAWINGS

Other features and advantages of the invention will become clear on reading the following description, this being made as a non-limiting example with reference to the following figures in which.

DETAILED DESCRIPTION OF THE PREFERRED EMBODIMENTS

Figure 1:
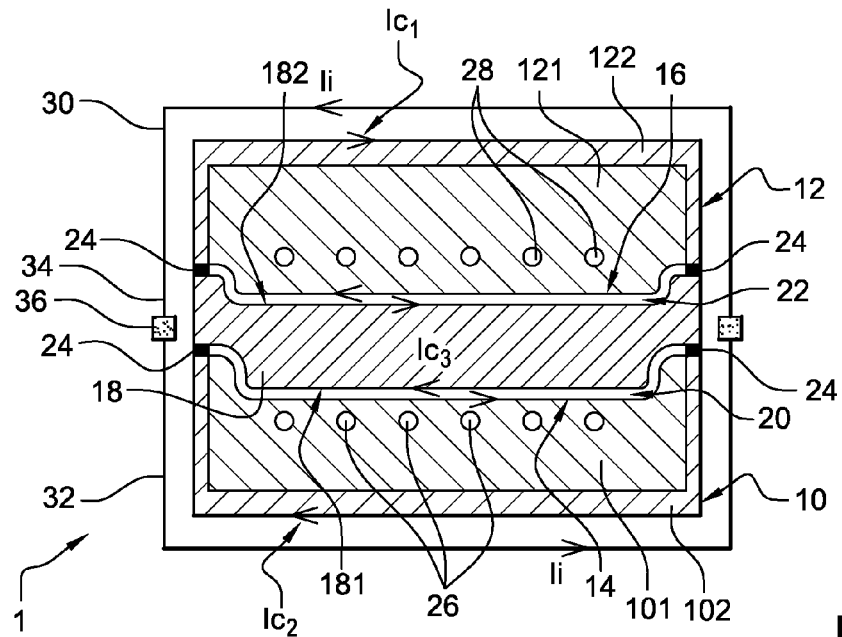
FIGS. 1 to 3 show a device according to the invention, in three states corresponding to three steps of its implementation.
Figure 2:
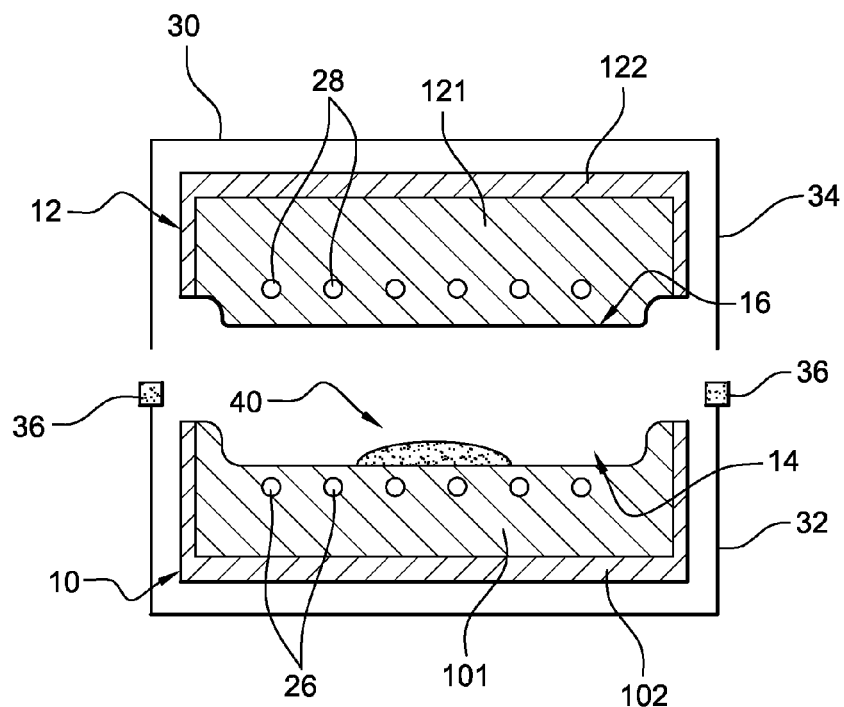
Figure 3:
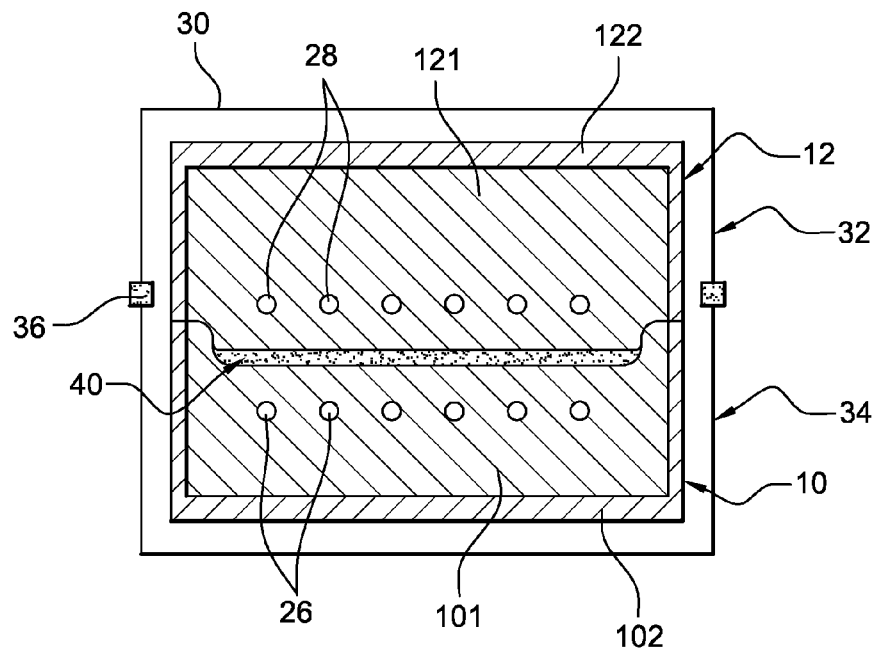

The device 1 shown in FIGS. 1-3, comprises two mold bodies, a lower mold body, or die 10, and an upper mold body, or punch 12. Both are made of an electrically conductive material, and they each comprise a portion constituting a heating zone, or molding zone, respectively 14 for the die 10 and 16 for the punch 12. The two mold bodies 10, 12 are able to come into contact with each other to achieve the molding of a piece, the molding zones 14, 16, arranged face-to-face, thus forming a closed chamber, for instance a compression chamber.

A network of inductors 30, electrically connected in parallel or in serial connection and connected to a power generator, is placed around the assembly formed by the die 10 and the punch 12. Each inductor 30 comprises a conductive turn and includes two separable portions 32, 34. The lower portion 32 is secured to the die 10 while the upper portion 34 is secured to the punch 12.

In accordance with the invention, to allow preheating of device 1 an intermediate part, or core 18, is placed between the die 10 and the punch 12. The core 18 is made of an electrically conductive material and its shape is adapted to the shape of the molding zones of the die and the punch. In the example in FIG. 1, the shape of the core 18 complements the shape of the molding zones exactly, but, as will be seen later, other configurations are possible. The core 18 is electrically insulated from the die 10 and the punch 12 thanks to shims 24 that are transparent to the electromagnetic field, for example made of ceramic. The insulation can be achieved by any other means, for example a silicone coating of a suitable thickness (a few millimeters), is placed either on the die and the punch or on each of the core's faces.

When the induction means 30 are powered by an alternating current $I_i$, the electromagnetic field surrounds both the two mold bodies and the core 18. The electrical insulation between the die and the core, on the one hand, and between the core and the punch, on the other hand, allows the electromagnetic field to flow in the two spaces separating the core and each of the two mold bodies. In this way two air gaps 20 and 22 are defined, one between the opposite faces of the core 18 and the die 10, the other between the opposite faces of the core 18 and the punch 12. To obtain this effect, it is also necessary for the die and the punch to be electrically insulated from each other when the core is in place, as shown in FIG. 1.

The magnetic field generated by the induction means 30 flows in the air gaps 20 and 22, i.e. between the die 10 and the core 18 and between the core 18 and the punch 12. It thus induces currents $Ic_1$, $Ic_2$, and $Ic_3$ with directions opposite to that of current $I_i$. Through the effect of the two air gaps 20, 22, these currents $Ic_1$, $Ic_2$, and $Ic_3$ flow in a closed loop independently, respectively in the die 10, the punch 12, and the core 18. More specifically, the induced currents $Ic_1$, $Ic_2$, $Ic_3$ flow on the surface of these three elements, in a very thin layer (a few tenths of a millimeter). These currents therefore have a thermal action (through a resistive effect) only on the surface of these three bodies, and notably at the surface of the molding zones 14, 16. The configuration of FIG. 1 therefore allows the molding zones of the die and the punch to be heated efficiently.

Once the molding zones 14, 16 have reached the desired temperature, the device 1 is opened, the core 18 is removed from it and a material 40 to be molded can then be deposited on the die 10. In the example in FIG. 2, the material is preheated before being deposited, but it is understood that other materials can be deposited without preheating. Then the punch is, in a conventional way, moved towards the die until these two elements are in contact and the molding (or compression) chamber is closed. It should be noted that at this stage, shown in FIG. 3, the die and the punch are no longer necessarily electrically insulated, since the induction means are no longer utilized. Since the mold is at the desired temperature, it no longer needs to be heated to mold the material 40.

Thanks to the core inserted between the die and the punch, one enjoys all the advantages of the presence of an air gap, as described for example in the aforementioned international patent application, and in particular:
  localization of the currents (and therefore the heating) at the surface, which leads to very fast heating since it is not the entire mold bodies that are heated,
  energy savings,
  a very fine level of adaptability of the heating through the use of different materials for certain portions of the molding zones,
  the possibility of having cooling means as close as possible to the molding zones, with the rapid cooling that results from this.

Such a result cannot be obtained without the presence of a core according to the invention, because in that case an air gap effect cannot be generated. Actually, the die and punch cannot be brought close enough together, especially in the context of a compression chamber that comprises closing surfaces perpendicular to the plane of the mold. The more complex the shapes of the molding zones, the more difficult this is.

With the invention it becomes possible to carry out the mold's heating/cooling cycles in the context of molding a material such as L.F.T. Coming back to the preceding example, of a material deposited at a temperature of 250° C., the mold can be brought up to a temperature that is very close, for example around 200° C., and then, once the material has been pressurized in the closed mold, the mold will be rapidly cooled to a temperature close to the ambient temperature (much lower than the value of 80° C. that can be achieved currently). Therefore, the flowing of the material and the efficient filling of the mold, combined with the perfect cooling and solidification of the finished part, are obtained in a shorter or equivalent cycle time. Moreover, it becomes possible to deposit the material at a lower preheat temperature, thus with a greater safety margin with respect to its degradation temperature. This also brings additional energy savings and allows even quicker cooling.

All of these improvements enable significant increases in the final quality obtained, over all criteria (minimum thickness achievable, quality of the surface condition, sharpness and quality of details such as ribbing, bosses, etc.)

The device according to the invention is even more effective when the presence of the two air gaps 20 and 22 has the effect of concentrating the magnetic flow within them, which further increases the action of the magnetic field at the molding zones, and thus the inductive energy brought to the surface of the molding zones.

The air gaps 20, 22 also make it possible to limit the influence of the geometry and/or distribution of the inductors on the resulting heating because the air gaps have the effect of distributing the energy from the inductors more evenly. Thus, inductive turns irregularly spaced over a given length along the mold have practically the same effect as the same number of inductive turns distributed regularly over the same length. It is noted that, in contrast, a conventional configuration with a coil inductor and an electrically conductive load without air gap produces an uneven energy distribution, the energy received by this load presenting a local maximum perpendicular to each inductive turn. This possibility of having an unequal distribution of inductor turns is particularly advantageous because, in the device that is the subject of the invention, the inductive turns surround the mold, and it can be equipped with a number of protruding elements, such as rising spacers, ejectors, etc. A larger clearance can therefore be left between two turns, when necessary, without affecting the quality of the heating.

The core 18 imposes relatively few constraints on its design and entails a negligible additional cost in relation to the rest of the device. Indeed, the core 18 can be designed in one piece, produced for example by molding or forging, and it requires no particular surface condition (not being intended to be in contact with the material to be molded) and therefore no costly machining. In addition, the mechanical forces applied to the core 18 during the heating phase are low, which imposes few constraints on its mechanical strength, and thus leaves considerable freedom in choosing the material it is made of. In most cases, the core 18 will also have a smaller thickness compared to the two mold bodies, which again reduces the manufacturing cost of the core 18, and more generally of the device according to the invention. The cost of a core is also negligible compared to the cost of producing a compression chamber allowing the die and punch to be electrically insulated while achieving the desired sealing.

Since the core's primary function is to delimit two air gaps within device 1, its shape is less constrained than the molding zones. It can therefore be given a shape that is not strictly complementary to those of the molding zones of the die and the punch (as shown in FIG. 1) but, instead, can be remote from it from place to place so as to define specific air gap shapes. It is also possible to design the two air gaps independently, especially to obtain various heating effects between the punch and the die (e.g. to heat the die more than the punch, etc.).

Figures 4A, 4B:
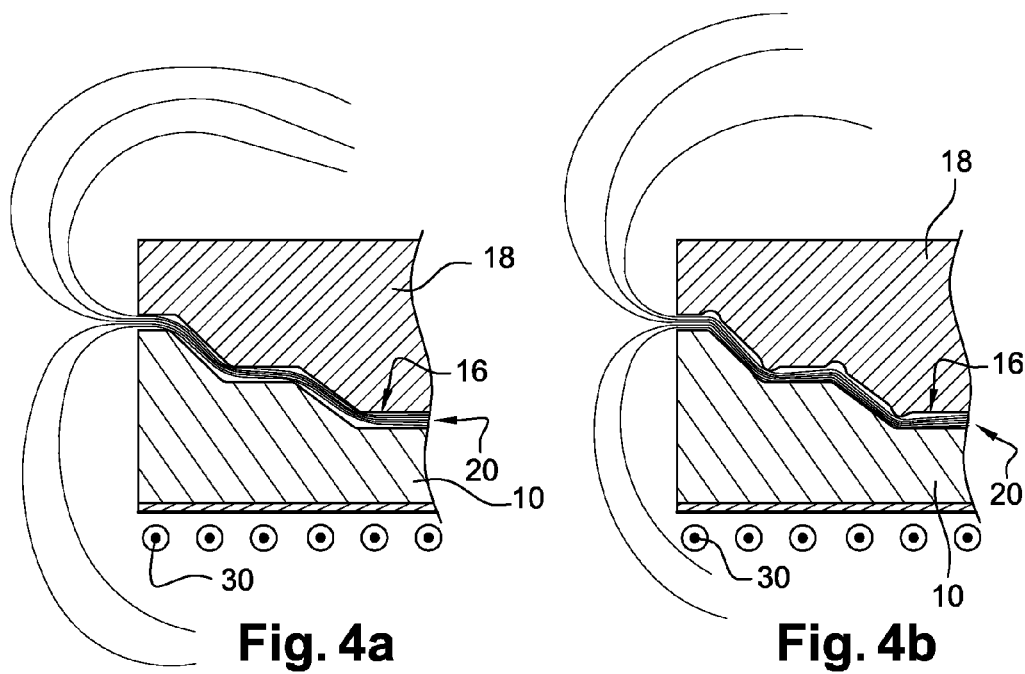
FIGS. 4a and 4b show a detail of the lower mold body and the intermediate part.

An example of a design adapted to the shape of the air gaps is described below. As the shape of the surfaces 181, 182 of the core 18 located opposite the molding zones 14, 16 can be relatively independent of the shape of the molding zones, this possibility can be used to finely tune the heating obtained by varying the inductive and resistive phenomena. In particular, the width of the air gap can be varied to avoid local underheating and/or overheating phenomena. As an example, FIGS. 4a and 4b show a detail of the device 1 showing the die 10 and the core 18, and the flow of the magnetic field in the air gap 20 generated by the inductors. FIG. 4a shows an air gap 20 of constant width and it is noted that when this is not linear, the flow lines are more concentrated inside the curve described by the air gap than outside, because the magnetic flow takes the path of least reluctance. Overheating and under-heating therefore occur at these locations, respectively inside and outside the curve. FIG. 4b shows the same air gap 20, but with a width that is not constant, especially a width that is varied locally in places where the air gap describes a curve. Depending on circumstances, an increase or decrease in this thickness makes it possible to correct the uneven distribution of magnetic flow seen in FIG. 4a. Thus it is noted in FIG. 4b that the flow distribution is uniform.

The material used to form the core 18 is advantageously non-magnetic with, preferably, a low electrical resistivity such as, for instance, copper or aluminum. This makes it possible to avoid energy losses as far as possible because it is unnecessary, in most applications, to heat the core 18. The currents induced by thee magnetic field will indeed go across and slightly heat the core made of a non magnetic material, but almost all the energy generated by the inductors will be injected into the die and the punch. For example, if the core 18 is made of aluminum, the energy it receives represents about 5% of the energy injected into the die 10 and the punch 12. Depending on circumstances, the core may be composed of different materials on its two faces or a single face (e.g. thanks to inserts), thus allowing the resistive and inductive phenomena (and thus the temperatures obtained) to be finely and locally controlled.

In order to minimize energy losses in the die 10 and the punch 12, these two elements can be made in two portions: one portion (respectively 101 for the die and 121 for the punch), including the associated molding zone 14, 16, comprises a magnetic material, possibly having a Curie point. A second portion (respectively 102 for the die and 122 for the punch) comprises a non-magnetic or weakly magnetic compound. The magnetic material forming the portions 101, 121 comprising the molding zones 14, 16 preferably has an electrical resistivity greater than that of copper, such as steel alloys based on nickel, chromium and/or titanium, for instance. A significant electrical resistivity of the molding zone is an advantage because it allows more efficient induction heating. However, it should be noted that the magnetic permeability of the material also affects the efficiency of the induction heating. Portions 102, 122, not including the molding zones, comprise a material achieving a good compromise between mechanical characteristics and electrical and magnetic properties. As a matter of fact, in order to limit the energy losses in these two portions located behind the molding zones and thus focus all the heating action at the surfaces of the molding zones, the material constituting portions 102, 122 should also be weakly magnetic and have as low a resistance as possible, while providing the necessary mechanical strength to withstand the significant and repeated forces of the molding phases. To this end, stainless steel and copper represent interesting selections.

In a variant, the die 10 and the punch 12 may be produced according to the method described in international patent application no. WO 2007/031660. Thus, the die 10 and the punch 12, including their respective molding zones, will be made entirely from a magnetic material, while the faces of the die and the punch located opposite induction means will be covered with a shielding layer made of a non-magnetic material such as copper, except for the surfaces of the molding zones 14, 16. In this configuration, the shielding is such that its thickness is greater than the electromagnetic field's penetration depth. Thus, the induced currents flow in the shielding layer, causing very little heating and little energy loss, except at the location of the molding zone's surface, where the material is very reactive to induction heating.

The device shown in FIGS. 1 and 2 is provided with a cooling system to allow the production or shaping of parts by heating at a high rate. To this end, a network of channels (respectively 26 and 28) is provided in the die 10 and in the punch allowing a coolant to be circulated in the vicinity of the molding areas' surfaces. Very good cooling thus obtained, first because the metal mold body is thermally very conductive, and secondly because the channels can be placed as close as possible to the surfaces of the molding zones 14, 16. This provides very efficient cooling since it is rapid and uniform over the entire part.

Figure 5:
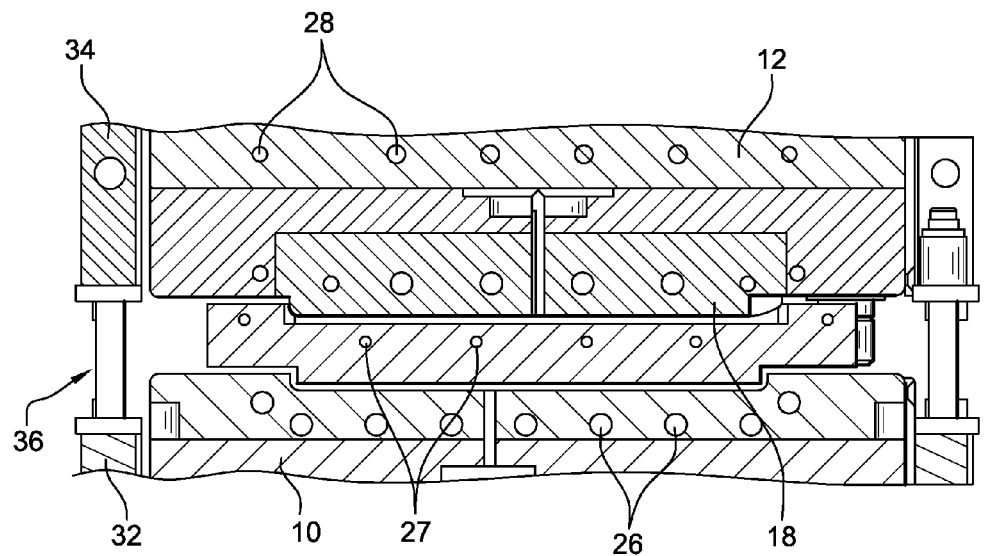
FIG. 5 shows a cross-section view of a device according to the invention.

In some cases, the core will also be provided with a cooling system, also in the form of channels 27, visible in FIG. 5. Indeed, even if it is not heated very much, it can reach a very high temperature after a certain number of cycles (cooling may also only be implemented only after a specified number of cycles).

Figure 6:
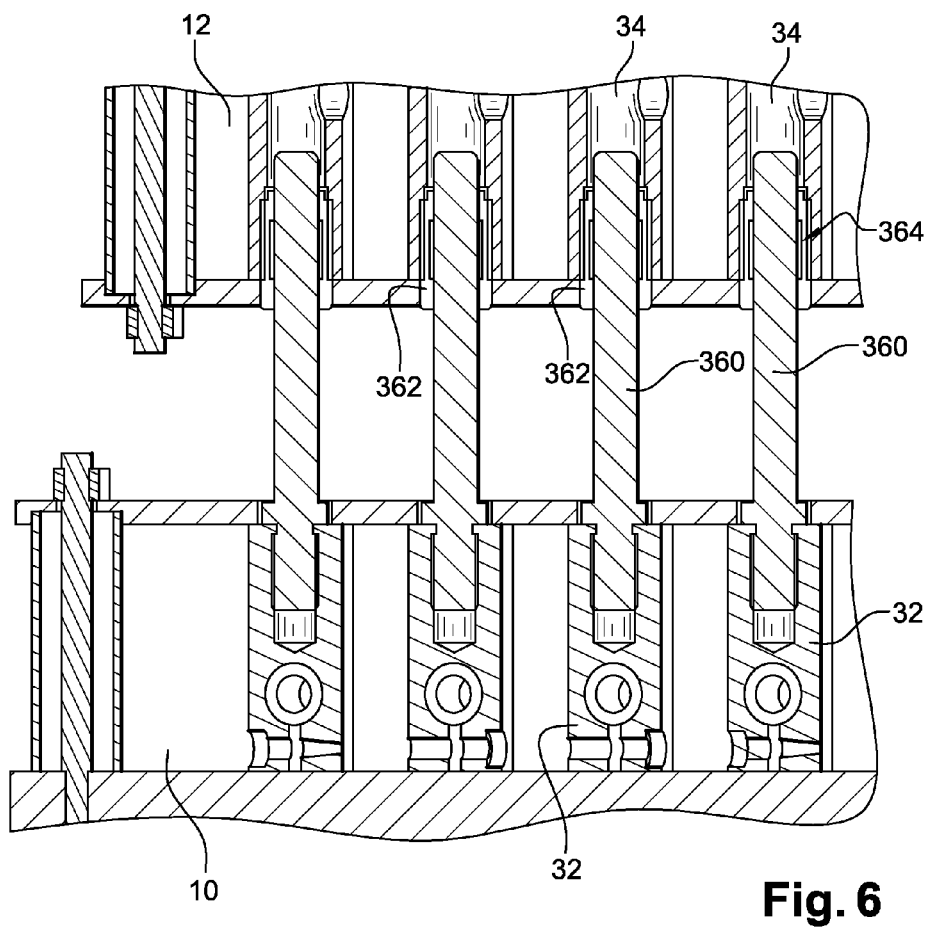
FIG. 6 is a detail view of an embodiment of electrical contactors with which the device in FIG. 5 is equipped.

As described above, the inductors 30 are in two separable portions 32, 34 secured respectively to the die 10 and the punch 12, which allows rapid removal of the part after molding, and therefore contributes to a high production speed. During the heating phase, the electrical continuity between the two portions 32, 34 of the inductor network is provided by electrical contactors 36. These electrical contactors allow large displacement while maintaining electrical continuity between the two separable portions. Indeed, to power the inductors when the core 18 is inserted between the die 10 and the punch 12, it is necessary to have a displacement that can exceed ten centimeters. Thus, in the example in FIG. 6, each contactor 36 is provided with a male element 360 secured to the lower portion 32, this male member sliding in a female element 362 secured to the upper portion 34. The electrical contact between the male element 360 and the female element 362 is provided, for example, by elastic metal strips 364, arranged inside the female element 362 and enclosing the male element 360. In the example, the female element is extended by a cavity in the upper portion 34 to secure the necessary displacement.

The device according to the invention also allows materials to be preheated in situ, i.e. directly in the mold. Preheating the material in situ is, for example, useful for certain composite materials that are in the form of a rigid plate when cold and which need to be preheated so that their shape can be changed correctly. In this way the material and the molding device are preheated simultaneously. For this purpose, the material is placed on the die 10 and the core 18 is placed against the material. To improve the efficiency of this preheating phase, it is advantageous to cover the core face in contact with the material with a contact coating, such as silicone. The core 18 can therefore exert pressure on the material, to improve contact between the hot die and the material, and thus the thermal conduction (however, in the absence of contact, convection between the die and the part is sufficiently effective to heat the material). In the case of an electrically conductive part (e.g. materials containing carbon fibers), this coating allows the core to be electrically insulated.

In a variant of the invention, applicable both to only preheating device 1 and to in situ preheating, the core 18 is made of a material allowing heating by radiation. For this purpose, such a material must have high thermal radiation when heated, for example a material having an emissivity greater than 0.7, such as graphite. Such a material is electrically conductive, which thus makes it possible to always ensure the primary function of the core according to the invention (i.e. delimiting two air gaps), but when its temperature rises due to the flow of induced currents it will heat the die and the punch by radiation. If in situ preheating is carried out via a radiant core, the core will be placed in close proximity to, and not in direct contact with, the material to be preheated.

In another variant, the use of a metal core 18 is provided, taking advantage of heating by thermal convection. The core will therefore be placed in close proximity to (but not in contact with) the die and the punch in the case where only device 1 is preheated or to the material and the punch in the case where the material is preheated in situ. Advantageously, the core 18 will be made of a material that is magnetic and/or has a high electrical resistivity, so that it is heated significantly through the action of the induction means.

The invention claimed is:

1. A molding device for the shaping of a material, said device comprising:
    a lower mold body, or die, made from an electrically conductive material and comprising a molding zone intended to be in contact with the material to be shaped;
    an upper mold body, or punch, made from an electrically conductive material, and comprising a molding zone intended to be in contact with the material to be shaped;
    a removable intermediate part, or core, made of an electrically conductive material, inserted between the die and the punch; and
    induction means capable of generating a magnetic field that surrounds the die, the punch and the core, the die, the punch and the core being electrically insulated in pairs,
    wherein a first air gap is delimited by a first face of the core and the molding zone of the die facing opposite the first face, and a second air gap is delimited by a second face of the core and the molding zone of the punch facing opposite the second face, said first and second air gaps formed such that the magnetic field flows therein and induces currents at respective surfaces of the molding zones of the die and the punch.

2. The device according to claim 1, wherein shims transparent to the magnetic field provide electrical insulation between the die and the core and between the core and the punch.

3. The device according to claim 1, wherein the molding zones of the die and the punch are configured to form a closed chamber.

4. The device according to claim 1, wherein a portion including the molding zone of at least one of the die and the punch comprises a magnetic compound.

5. The device according to claim 4, wherein a portion of at least one of the die and the punch comprises a different material from the portion including the molding zone, said different material being a non-magnetic or weakly magnetic material.

6. The device according to claim 1, wherein at least one of the die and the punch comprises a magnetic material, with a surface located opposite the induction means, except for a molding zone surface which is covered with a layer of shielding made of a non-magnetic material for preventing the magnetic field from penetrating into the at least one of the die and the punch.

7. The device according to claim 1, wherein the core comprises a non-magnetic material of a low electrical resistivity.

8. The device according to claim 1, wherein the core comprises a contact coating.

9. The device according to claim 1, wherein the core comprises a material having an emissivity greater than 0.7.

10. The device according to claim 1, wherein at least one of the die and the punch comprises a network of cooling channels.

11. The device according to claim 1, wherein the core comprises a network of cooling channels.

12. The device according to claim 1, wherein a frequency (F) of the magnetic field generated by the induction means is greater than or equal to 10 kHz.

13. The device according to claim 1, wherein the induction means comprise two separable portions, respectively secured to the die and the punch.

14. A method of preheating a device according to claim 1, comprising the steps of:
    inserting the core between the die and the punch;
    electrically insulating, in pairs, the core, the die and the punch, so that the first face of the core and the molding zone of the die, and the second face of the core and the molding zone of the punch, respectively delimit said first and second air gaps; and
    powering the induction means for generating the magnetic field that surrounds the die, the punch and the core such that the magnetic field flows in the first and second air gaps and induces the currents at the respective surfaces of the molding zones of the die and the punch.

15. A molding method, comprising the steps of:
    implementing the preheating of the molding device in accordance with the method according to claim 14;
    removing the core from the molding device;
    depositing a material to be molded on one of the die and the punch;
    molding the material by pressurization between the die and the punch;
    cooling the mold; and
    removing the solidified part.

16. A molding method, comprising the steps of:
    implementing the preheating of the molding device in accordance with the method according to claim 14, a material to be molded having been previously placed between the die and the core;
    removing the core from the molding device;
    molding the material by pressurization between the two mold bodies;
    cooling the mold; and
    removing the solidified part.

17. The device according to claim 4, wherein said portion comprises one of the group consisting of a nickel-, chromium- and/or titanium-based steel.

18. The device according to claim 5, wherein the different material is stainless steel.

19. The device according to claim 6, wherein the non-magnetic material of the core is aluminum.

20. The device according to claim 12, wherein the frequency (F) of the magnetic field generated by the induction means is less than or equal to 100 kHz.

* * * * *